United States Patent [19]

Karikawa

[11] 4,085,413
[45] Apr. 18, 1978

[54] APPARATUS FOR RETARDING CAMERA SHUTTER RELEASE

[75] Inventor: Tohru Karikawa, Tokyo, Japan

[73] Assignee: Asahi Kogaku Kogyo Kabushiki Kaisha, Tokyo, Japan

[21] Appl. No.: 749,564

[22] Filed: Dec. 10, 1976

[30] Foreign Application Priority Data

Dec. 12, 1975  Japan .................... 50-167949[U]

[51] Int. Cl.² ............................................. G03B 9/64
[52] U.S. Cl. .................................. 354/137; 354/238; 354/267
[58] Field of Search ............... 354/137, 138, 237, 238, 354/266, 267, 239, 240

[56] References Cited

U.S. PATENT DOCUMENTS

| | | | |
|---|---|---|---|
| 3,200,722 | 8/1965 | Hutchison, Jr. | 354/137 |
| 3,833,915 | 9/1974 | Tanaka et al. | 354/267 X |

Primary Examiner—L. T. Hix
Assistant Examiner—M. L. Gellner

Attorney, Agent, or Firm—Sughrue, Rothwell, Mion, Zinn and Macpeak

[57] ABSTRACT

An electro-mechanical shutter release delay apparatus includes a front curtain lock lever 4 sharing a common pivot axis 6 with a release lever 5 and joined to the latter by a spring 7. The depression of a shutter release rod 8 initially rotates the release lever 5 to close a first switch $S_1$ which energizes front and rear curtain holding magnets $M_1$ and $M_2$. Continued depression tensions the spring and eventually closes a second switch $S_2$. The latter energizes a flood lamp and initiates a time delay circuit, whose output deenergizes the front curtain holding magnet. The spring then rotates the lock lever to release the front curtain and commence the exposure, by which time the lamp has reached maximum intensity. After the proper exposure time has elapsed the rear curtain holding magnet is deenergized to release the rear curtain and terminate the exposure.

Self-timing may be implemented by increasing the delay period provided by the time delay circuit, and including a notched holding lever 10 to latch the release lever 5 in its rotated position.

4 Claims, 3 Drawing Figures

APPARATUS FOR RETARDING CAMERA SHUTTER RELEASE

BACKGROUND OF THE INVENTION

This invention relates to an apparatus for retarding the shutter release of a camera to enable the intensity of flash or flood lights to reach a maximum level.

When a picture is taken with the aid of artificial illumination by a single lens reflex camera, such as a coeliac photograph using a fiber scope, it is necessary to increase the intensity of the light at the time of exposure. To this end, the prior art teaches devices for independently controlling the luminosity of a light source before the camera is actuated. This is disadvantageous, however, in that brilliant light rays may strike the eyes of a photographer for a longer period of time than required, to the discomfort and suffering of the photographer For the best results, the intensity of the artificial light should be at a maximum when the shutter is released. It takes a certain time after the energization of a light source for its intensity to reach a maximum, however, particularly in the case of tungusten bulb lamp. Thus, it is desirable that the light source be energized at a predetermined time in advance of the shutter release.

SUMMARY OF THE INVENTION

It is accordingly an object of the present invention to provide an apparatus for retarding the shutter release of a camera which is simple in construction and meets the above-described requirements. The apparatus may also be utilized as a self-timer for a camera.

Briefly, and in accordance with the present invention, an electro-mechanical shutter release delay apparatus includes a front curtain lock lever sharing a common pivot axis with a release lever and joined to the latter by a spring. The depression of a shutter release rod initially rotates the release lever to close a first switch which energizes front and rear curtain holding magnets. Continued depression tensions the spring and eventually closes a second switch. The latter energizes a flood lamp and initiates a time delay circuit, whose output deenergizes the front curtain holding magnet. The spring then rotates the lock lever to release the front curtain and commence the exposure, by which time the lamp has reached maximum intensity. After the proper exposure time has elapsed the rear curtain holding magnet is deenergized to release the rear curtain and terminate the exposure.

Self-timing may be implemented by increasing the delay period provided by the time delay circuit, and including a notched holding lever to latch the release lever in its rotated position.

DETAILED DESCRIPTION OF THE PREFERRED EMBODIMENTS

Figure 1:
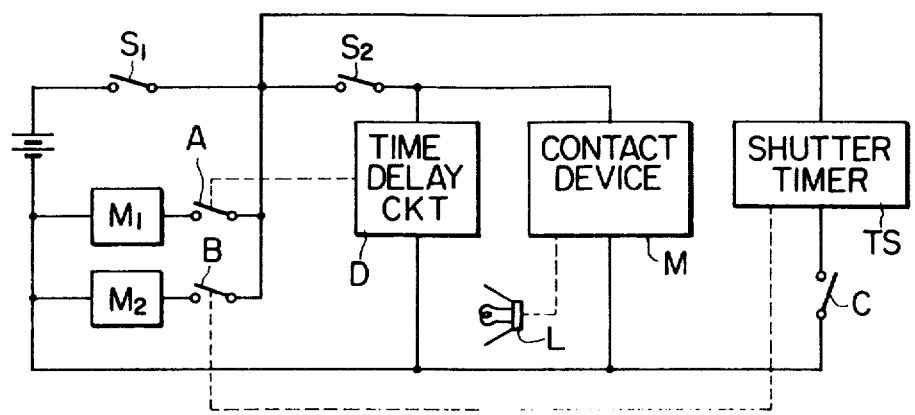
FIG. 1 shows a block diagram of the electrical circuit of a shutter-release retarding apparatus according to the present invention.

FIG. 1 diagramatically shows the construction of the present invention applied to an electronic shutter camera. When the camera shutter release button is depressed, switch $S_1$ is first closed, which energizes electromagnets $M_1$ and $M_2$ through normally closed switches A and B. $M_1$ holds the front shutter curtain in its cocked position, and $M_2$ similarly holds the rear shutter curtain. The continued depression of the release button closes switch $S_2$, which energizes the time delay circuit D and the contact device M. The latter then energizes the flood lamp(s) L. After a short time delay, circuit D opens switch A to deenergize magnet $M_1$. This releases the front shutter curtain to initiate the exposure. The movement of the front shutter curtain closes switch C which energizes the shutter timer TS. After the exposure time has elapsed, the shutter timer opens switch B to deenergize magnet $M_2$, which releases the rear shutter curtain to terminate the exposure.

Figure 2:
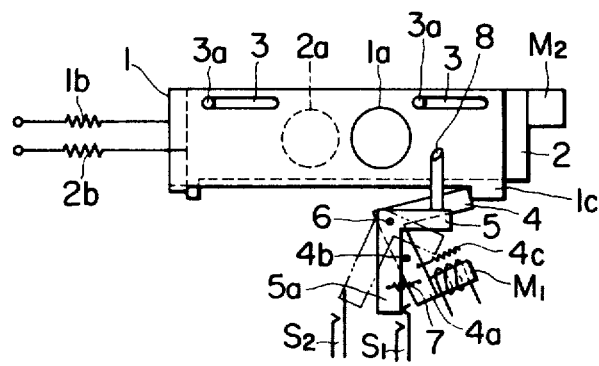
FIG. 2 shows a camera shutter construction wherein the apparatus of the present invention is applied to controlling a light source.

FIG. 2 shows a shutter in the cocked condition. A front curtain 1 has an exposure aperture 1a, a front curtain spring 1b, and a lock sear 1c. A rear curtain 2 has an exposure opening 2a, and a rear curtain spring 2b. Guide slots 3 and posts 3a are provided in the front and rear curtains, respectively, so that the curtains may slidingly travel within the limits of said guide slots and posts to provide an aligned exposure opening. A lock lever 4 arrests the front curtain sear 1c in the cocked position. The lock lever 4 has a limit pin 4b on one arm, and has a tendency to rotate in a counterclockwise direction under the influence of a spring 4c. Said one arm of the lock lever 4 is also attractively held in the position shown when the magnet $M_1$ is energized. A release lever 5 is mounted on a common rotary shaft 6 together with the lock lever. The lock lever 4 and release lever 5 are interconnected by a spring 7, and the relative position of these levers is governed by the limit pin 4b. A shutter release rod 8 is in contact with the release lever 5. The switches $S_1$ and $S_2$ are disposed within the range of pivotal movement of the release lever 5.

In operation, during the initial downward movement of the shutter release rod 8, the release lever 5 is rotated slightly in the clockwise direction, thereby closing switch $S_1$ and energizing the magnets $M_1$ and $M_2$. As the release lever rotates to this intermediate position the tension of spring 7 is not sufficiently high to overcome that of spring 4c, whereby the look lever 4 remains in the position shown until the magnet $M_1$ is energized, rather than being rotated to release the front shutter curtain. As the release rod 8 is further depressed the release lever 5 eventually reaches the position shown by the dotted line, whereat the tension of spring 7 is sufficiently high to overcome the restraining force of spring 4c and release the front curtain once the magnet $M_1$ is deenergized. At this same instant the switch $S_2$ is closed whereby a lamp control signal is produced by the contact device M, thereby energizing a light source, and at the same time the delay circuit D is actuated. After a preset time delay (for example 20 ms) the circuit D interrupts the current flow to the magnet $M_1$, whereby the lock lever 4 is released to rotate in a clockwise direction under the overriding force of spring 7, which in turn releases the front curtain of the shutter to begin the exposure. In an electronically controlled shutter, the timing setting circuit TS is actuated in response to the movement of the front curtain or by the output of the delay circuit D, and interrupts the current flow to the magnet $M_2$ after the exposure time has elapsed, thus releasing the rear curtain to terminate the exposure. If the apparatus is used with a mechanically timed shutter, the magnet $M_2$ and the circuit TS may be omitted, and the rear curtain is mechanically released after the exposure time has elapsed. Of course, when the shutter rod or button is released, the spring 4c returns the lock lever and release lever to their initial positions, which opens switches $S_1$ and $S_2$.

Figure 3:
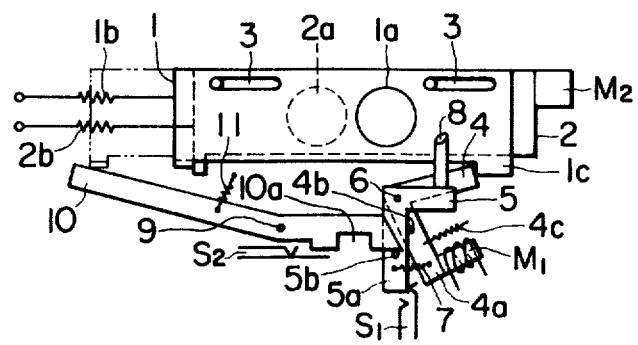
FIG. 3 shows a similar shutter construction adapted for use as a self-timer.

FIG. 3 illustrates an embodiment having a release lever holding mechanism which can be utilized as a self-timer. The circuit of FIG. 1 would have to be slightly modified for use with the FIG. 3 embodiment, but such modifications have not been shown as they are obvious and form no part of the present invention. A holding pin 5b is provided on one arm of the release lever 5, and a holding lever 10 having a recess 10a is urged in a clockwise direction about a rotary shaft 9 by a spring 11. One end of the holding lever extends into the path of travel of the front curtain 1. When the release rod 8 is initially depressed the release lever 5 is rotated in a clockwise direction to close switch $S_1$, and in turn the arm 4a of the lock lever is attracted to magnet $M_1$, as in the case of FIG. 2. When the release lever is further rotated in a clockwise direction the spring 7 stores sufficient force to release the lock lever, and the pin 5b enters the recess 10a, whereby the holding lever 10 is rotated in a clockwise direction to retain the release lever 5 in a latched position. Simultaneously, the starter switch $S_2$ is opened (the switch may also be arranged to be closed at this instant) and the delay circuit D is actuated. After a desired time delay (for example 10 sec.), current to the magnet $M_1$ is interrupted. Thus, the lock lever 4 is free to rotate in a clockwise direction to release the front curtain of the shutter and commence the exposure. The holding lever 10 is rotated counterclockwise at this time, in response to the travel of the front curtain, to thereby return the release lever 5 to its home position. The remaining operation is as described in connection with FIG. 2. According to this embodiment, if the operator removes his finger from the release rod or button during the operation of the delay circuit, the release lever 5 will remain in the shutter release position whereby a self-timing function is achieved. The circuit of FIG. 1 may easily be modified whereby the transfer of switch $S_2$ actuates the delay circuit D, and the latter energizes (or deenergizes) the contact device M a short time (for example 20 ms) before the magnet $M_1$ is deenergized.

An advantage of the shutter release retarding apparatus according to the present invention is a simple construction. Another advantage is that, when a light source is controlled in response to an output signal from the contact device M connected to the delay circuit, a shutter release delay time is provided whereby the light source reaches maximum intensity before the shutter is released. A further advantage is that by adding a release lever holding mechanism to the apparatus, it may be utilized as a self-timer.

What is claimed is:

1. An apparatus for retarding the release of a camera shutter, comprising:
    (a) movable, spring biased shutter means,
    (b) a pivotal locking lever for holding the shutter means in a cocked position,
    (c) a pivotal release lever,
    (d) a spring coupling the locking lever to the release lever,
    (e) an electro-magnet for preventing the rotation of the locking lever when energized,
    (f) a first switch operable in response to the initial movement of the release lever for energizing the electro-magnet,
    (g) a time delay circuit, and
    (h) a second switch operable in response to the further movement of the release lever for actuating the time delay circuit, whereby the output from the latter deenergizes the electro-magnet and the spring rotates the locking lever to release the shutter means.

2. An apparatus as defined in claim 1, further comprising:
    (a) a source of photographic illumination, and
    (b) means for energizing said source in response to the actuation of the second switch, whereby the illumination reaches a maximum intensity during the time delay and before the shutter means is released.

3. An apparatus as defined in claim 1, wherein the shutter means comprises mutually slidable front and rear curtains, and the locking lever engages the front curtain, and further comprising a further electro-magnet, energized in response to the acutation of the first switch, for preventing the release of the rear curtain, and a shutter timing circuit, actuated concurrently with the release of the front curtain, for deenergizing said further electro-magnet after a desired exposure time lapse.

4. An apparatus as defined in claim 1, wherein said time delay circuit is preset for a desired self-timing interval, further comprising a pivotal, spring biased holding lever having one end disposed in the travel path of the shutter means and another, notched end operatively disposed adjacent the second switch and the release lever, and a post mounted on the release lever and adapted to engage the notch, whereby the release lever is latched in its position of further movement to thereby implement a self-timing function.

* * * * *